United States Patent
Hlynsky

[19]
[11] Patent Number: 5,961,701
[45] Date of Patent: Oct. 5, 1999

[54] MOISTURE SEPARATOR FOR DIGESTER GASES AND LANDFILL GASES AND RAW NATURAL GASES

[75] Inventor: Julian S. Hlynsky, Calgary, Canada

[73] Assignee: Vision Almet Limited, Mississauga, Canada

[21] Appl. No.: 08/881,440

[22] Filed: Jun. 24, 1997

[30] Foreign Application Priority Data

Mar. 24, 1997 [CA] Canada ................................ 2200825

[51] Int. Cl.$^6$ .......................... B01D 45/12; B01D 19/00
[52] U.S. Cl. ................................ 96/209; 96/408; 55/355; 55/459.1; 55/459.4
[58] Field of Search .......................... 55/355, 425, 459.1, 55/459.4, 459.5; 96/209, 216, 408, 411, 412, FOR 109

[56] References Cited

U.S. PATENT DOCUMENTS

| | | | |
|---|---|---|---|
| 1,444,585 | 2/1923 | Collins | 55/459.1 |
| 2,015,464 | 9/1935 | Saint-Jacques | 55/459.1 |
| 2,068,459 | 1/1937 | Monaghan | 55/459.1 |
| 2,152,114 | 3/1939 | Van Tongeren | 55/459.1 |
| 2,259,919 | 10/1941 | Bacon et al. | 55/459.1 |
| 2,511,967 | 6/1950 | Campbell | 55/355 |
| 2,849,079 | 8/1958 | Evans | 96/408 |
| 3,513,642 | 5/1970 | Cornett | 55/459.5 |
| 3,545,735 | 12/1970 | Wolf et al. | 55/459.1 |
| 3,922,151 | 11/1975 | Kiss et al. | 55/459.4 |
| 4,519,822 | 5/1985 | Hatano et al. | 55/459.1 |
| 4,596,586 | 6/1986 | Davies et al. | 55/459.5 |
| 4,681,612 | 7/1987 | O'Brien et al. | |
| 4,684,345 | 8/1987 | Cattani | 96/209 |
| 4,704,146 | 11/1987 | Markbreiter et al. | |
| 4,900,345 | 2/1990 | Le Jeune | 55/459.5 |
| 5,059,405 | 10/1991 | Watson et al. | |
| 5,273,647 | 12/1993 | Tuszko et al. | 55/459.1 |
| 5,275,233 | 1/1994 | Little | |
| 5,502,984 | 4/1996 | Boehde et al. | 55/459.1 |

FOREIGN PATENT DOCUMENTS

| | | |
|---|---|---|
| 0024148 | 2/1981 | European Pat. Off. |
| 0140402 | 5/1985 | European Pat. Off. |
| 0450510A2 | 10/1991 | European Pat. Off. .............. 55/459.1 |
| 997831 | 2/1983 | U.S.S.R. ............... 55/459.1 |
| 1217488 | 3/1986 | U.S.S.R. ............... 55/459.4 |
| 1346262 | 10/1987 | U.S.S.R. ............... 55/459.1 |
| 1623722 | 1/1991 | U.S.S.R. ............... 55/459.1 |
| 757424 | 9/1956 | United Kingdom. |
| 1473654 | 5/1977 | United Kingdom. |
| 2000054 | 6/1978 | United Kingdom. |
| 2035150 | 11/1978 | United Kingdom. |

OTHER PUBLICATIONS

"The Energy Savers—Increase Caloric Capacity of Digester Gas", Lanny Barr, Feb. 1988.

*Primary Examiner*—C. Scott Bushey
*Attorney, Agent, or Firm*—Baker & Daniels

[57] ABSTRACT

Two versions of centrifugal type separators capable of removing moisture from digester gases, landfill gases and raw natural gases, each separator including an upright housing having a cylindrical upper region (of a circular cross-section) and a conical lower region which tapers downwardly. A tangential inlet is located in an upper region of the housing. A gas outlet is located centrally in a top end of the housing. An outlet to remove separated liquid is provided at the bottom of the housing. There is a trap system that preferably includes a liquid holding tank for providing a positive water seal in order to prevent explosive gases from escaping through the liquid outlet. One version of separator is suitable for a high pressure gas stream, i.e., 3.0 psig or higher, while the second version is suitable for lower pressure gas streams, i.e., from 6 inches to 30 inches of water. In the second version, the water seal is formed in the conical lower region of the housing and its water level is maintained by the location of an upper end of a drain outlet line. A vent line is open to atmosphere to maintain atmospheric pressure in the drain line.

21 Claims, 4 Drawing Sheets

MOISTURE SEPARATOR FOR DIGESTER GASES AND LANDFILL GASES AND RAW NATURAL GASES

BACKGROUND OF THE INVENTION

This invention relates to centrifugal type separators for removing moisture from a moisture laden gas stream consisting of such gases as digester gases, landfill gases and raw natural gases.

Digester gas is generated by digester sludge tanks of various types and sizes. This gas is a bi-product of the anaerobic digestion process of raw sludge from waste water treatment plants. Digester gas contains approximately 70% methane ($CH_4$), 27% carbon dioxide ($CO_2$) and about 3% of other gases. The gas carries with it not only moisture but various impurities such as dirt. Because of its high methane content, it is classified as a hydrocarbon fuel having a calorific value in the range of 16 to 22 kJ/cu. metre. The calorific value is dependent to some extent on the moisture content. The economic viability of the anaerobic digestion process is dependent upon the quantity and calorific capacity of the gas mixture produced by the process. By using a process that reduces the moisture content, the calorific value of the gas can be increased. Digester gas can be used as a fuel for firing boilers utilized for plant heating systems, to heat digesters, and to drive engine-driven generators used to produce electrical power.

An important factor that must be taken into account in the treatment and use of digester gas is that the gas can be explosive when it is in contact with air in a certain proportion (ie. in the range from 5:1 to 20:1).

It is known to use manual, mechanically operated moisture separators or drip traps in order to remove moisture and dirt from a moisture laden gas stream in order to increase its calorific value. However, such separators are plagued with several shortcomings and difficulties. Firstly, because of their lower efficiency in removing moisture, the resulting gas has a low calorific value and may even be unable to sustain a continuous flame. Moreover, generally there is a need for frequent attendance and maintenance of these separators. The potential for an explosion is significant and can arise from improper maintenance or even temporary lack of attendance. Further, there is a danger of moisture and dirt build-up in gas lines leading to possible flooding of control valves, flame arrestors, meters and other equipment, reducing accuracy of instrumentation, and creating a safety hazard.

In addition to these known separators, automatic continuous types of digester gas moisture separators have been used in the 1980's in North America. These separators are essentially gravity type separators with some inertial separation achieved by the addition of a deflector or baffle plate which changes the direction of gas flow. These separators which have a cylindrical body configuration have improved reliability of operation and are slightly more efficient at moisture separation. However, their efficiency is below 50% and their pressure losses are high due to low regain of static pressure. Their design tends to be rather crude and they lack the required features to enable efficient separation of moisture and contaminants from the gas stream.

It is an object of the present invention to provide an improved centrifugal-type separator providing more efficient removal of moisture from the gas stream, which in turn leads to increased calorific value of the digester gas.

It is a further object of the invention to provide a separator which can minimize attendance and maintenance of the separator. The preferred separators described herein can also prevent possible flooding of control valves, meters, flame arrestors and other equipment due to moisture build-up in gas lines. Also, these centrifugal-type separators can be made suitable for a variety of digester gas system layouts. They can be constructed for different capacities and for a variety of operating conditions, ranging from the simplest to complex, large systems.

SUMMARY OF THE INVENTION

According to one aspect of the invention, a centrifugal cyclone type separator for removing moisture from a moisture laden gas stream includes an upright separator housing having an interior with a substantially circular horizontal cross-section and a conical lower region which tapers downwardly from an upper region of the housing. A tangential gas inlet for the gas stream is located in the upper region of the housing. A gas outlet is located centrally in a top end of the housing and this outlet includes a vertically extending pipe section connected to the housing. A liquid outlet removes separated liquid from the lower region. The separator includes a trap system having a liquid holding tank for providing a positive water seal in order to prevent gases from escaping through the liquid outlet. The holding tank is connected to the liquid outlet so that the liquid at a bottom end of the housing can flow through the liquid outlet and into the holding tank during operation of the separator.

The trap system includes a liquid level gauge mounted on the holding tank and having first (high) and second (low) liquid level sensors for sensing the level of liquid in the liquid holding tank. There is also a third liquid level sensor for detecting when the level of liquid in the tank has risen to a level above a predetermined maximum height. A warning device is operable to generate a warning and is turned on by the third liquid level sensor when the sensor detects a liquid level above the predetermined maximum height.

According to another aspect of the invention, a separator for removing moisture from a moisture laden gas stream comprises a separator apparatus having an upright housing with a tangential gas inlet for the gas stream located in an upper region of the housing and a gas outlet located in a roof of housing. The housing, which is generally circular in horizontal cross-section, has a conical lower region which tapers downwardly from the upper region. A vertically extending, substantially cylindrical gas outlet pipe has an open upper end at the gas outlet and an open bottom end that is at or below a lowermost side of the tangential gas inlet. A liquid outlet is provided to remove separated liquid from the lower region and a trap system provides a positive water seal at a bottom end of the housing in order to prevent gases from escaping through the liquid outlet. There are a series of curved, similar guiding vanes disposed centrally below the bottom end of the gas outlet pipe. These vanes are spaced a substantial distance below the bottom end of the pipe section and are arranged to guide a whirling gas stream into the outlet pipe through its bottom end. A space is formed between the top ends of the vanes and the bottom end of the outlet pipe and this space is substantially open.

In a preferred embodiment, the pipe section extends below the lowermost side of the tangential inlet. The guiding vanes are curved in a horizontal plane and distributed evenly about a vertical central axis of the pipe section.

According to a further aspect of the invention, a centrifugal type separator for removing moisture from a moisture laden gas stream includes a centrifugal cyclone-type separator housing with a substantially circular interior horizontal cross-section and a conical lower region that tapers downwardly from an upper region of the housing. There is a tangential gas inlet for the gas stream located in the upper region and there is also a gas outlet located centrally in a roof of the housing. A vertically extending gas outlet pipe section is connected to the outlet and has an open bottom end that is at or below a lowermost side of the tangential gas inlet. A liquid outlet is provided to remove separated liquid from the lower region. A gas flow guiding plate having the shape of a conical frustrum tapers upwardly to an open top. This guiding plate, which also has an open bottom, is located centrally below the bottom end of the gas outlet pipe section.

A deflector is preferably mounted inside the housing on an upstream side of the tangential gas inlet and is adapted to deflect a circulating gas stream in the upper region of the housing so that the deflected gas stream tends to flow parallel to a gas stream entering the housing through the tangential gas inlet during use of the separator.

Preferably the deflector comprises a plate member that is curved in plan view and has a leading vertical edge adjacent a wall of the housing. Also, the bottom of the deflector plate is preferably slightly lower than the bottom of the gas inlet.

Further features and advantages will become apparent from the following detailed description of preferred embodiments taken in conjunction with the accompanying drawings.

DETAILED DESCRIPTION OF PREFERRED EMBODIMENTS

Figures 1, 2:
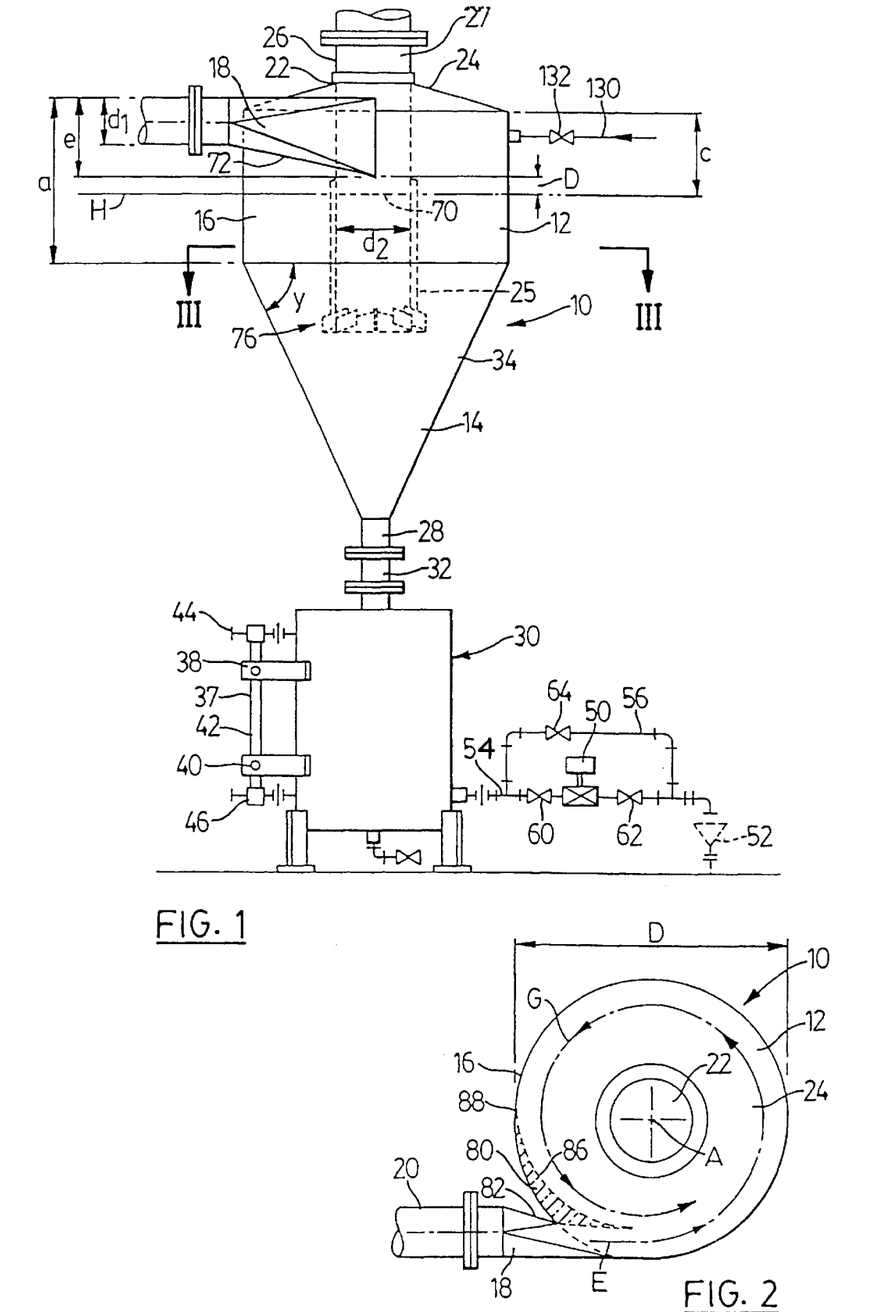
FIG. 1 is a schematic elevational view of a centrifugal cyclone-type separator designed and constructed in accordance with the invention.
FIG. 2 is a top view of the separator of FIG. 1 showing the tangential inlet.
Figure 3:
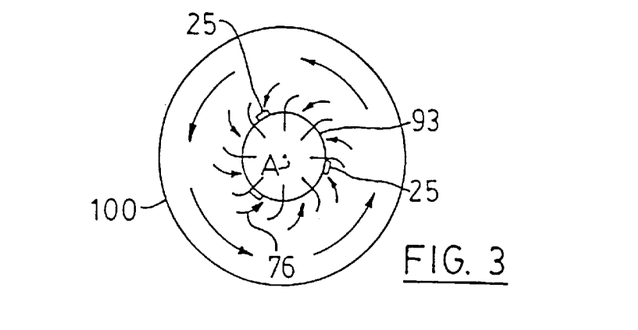
FIG. 3 is a cross-sectional detail view taken along the line III—III of FIG. 1.

FIGS. 1 to 3 illustrate a preferred form of centrifugal type separator 10 for removing moisture from a moisture laden gas stream which could comprise digester gas, landfill gas or raw natural gas. This preferred separator can be constructed to automatically operate at gas pressures exceeding 3.0 p.s.i.g. (21.0 kPa). As explained further hereinafter, different models of centrifugal-type separators can be constructed that incorporate one or more features of this invention. The selection of a specific model of separator for a particular application will depend upon the gas system piping and equipment layout, operating conditions, economic considerations and other factors known in the industry.

The preferred separator 10 has an upright separator or cyclone housing or body 12 having a cylindrical upper region 16 with an interior having a substantially circular horizontal cross-section. The illustrated body 12 has a conical lower region 14 which tapers downwardly from the cylindrical upper region 16. The upper region 16 can taper upwardly towards the roof if desired. The roof 24 has a conical frustum shape and in one preferred embodiment the slope of this roof is about 25 degrees to a horizontal plane. There is a tangential inlet 18 for the incoming gas stream located in the upper region 16 of the housing. It will be understood that a gas duct or pipe 20 normally forms the tangential inlet. In the illustrated separator, the tangential inlet 18 is located in the upper half of the upper region 16. A gas outlet 22 is located centrally in the conical roof 24 of the housing. The gas outlet includes a vertically extending pipe section 26 connected to the top of the conical roof. The pipe section 26 can terminate with a flange 27 for connection to the gas system piping. In use of this separator, the gas exiting through the outlet 22 will have increased calorific value as a result of the removal of moisture in the separator. There is also a liquid outlet 28 for removing separated liquid, normally water, from the lower region 14. The outlet 28 as shown comprises a vertical outlet pipe welded to the lower region 14 and connected to a holding tank 30 by a flanged connection.

In one preferred embodiment of the separator 10, the conical lower region tapers inwardly at an angle Y that is 60 degrees measured from a horizontal plane.

The preferred separator system 10, which is designed for "high" gas pressures, is equipped with a trap system that includes a liquid holding tank 30 for providing a positive water seal in order to prevent undesirable gases from the gas stream from escaping through the liquid outlet 28. The holding tank 30 is connected to the liquid outlet by means of the vertical pipe 28 so that liquid at a bottom end of the housing 12 can flow through the liquid outlet and into the holding tank 30 during operation of the separator.

The principles of operation of the illustrated centrifugal cyclone type separators will now be explained briefly. In any such separator the suspended particles in the gas stream must move some distance laterally across the gas stream. They must then be entrapped in some manner so that they cannot again enter the "cleaned" gas. In a centrifugal type separator such as a separator 10, it is the centrifugal force of rotation and inertial force that contribute to the entrapment of these moisture particles. For effective separation, the differential force acting upon the particles must be as great as possible and the distance through which the particles move must be a minimum distance. Since the particles must traverse the gas stream laterally, the gas stream should be as narrow as possible or should be broken into a number of streams of small dimensions.

In the illustrated separators, the moisture laden gas enters through the inlet 18, then whirls through several revolutions in the cyclone body or housing 12, depositing its moisture load, and departs in a whirling manner through the axial, cylindrical gas outlet 22. Under the influence of the centrifugal force, the moisture particles which were dispersed throughout the entering gas stream, tend to concentrate in a thin layer next to the cyclone wall 34 (housing is also referred to as a cyclone). It will be understood that two distinct vortexes are present in a properly designed separator of this type, the first being an outer, large diameter descending helical current in the upper section and in the lower region (which current is formed by moisture particles), and the second being an ascending helix of small diameter formed by gas. The second vortex extends upward from the lower end of the cyclone to the vertical gas outlet.

The sizing of the inlet duct (or pipe) is based on the velocity of the gas stream which generally ranges from 3600 to 3700 f.p.m. and is calculated from the formula Q=V×A where:

Q is flow capacity expressed in c.f.m. (ft³ per minute)

V is flow velocity expressed in f.p.m. (ft per minute)

A is duct area expressed in square feet (ft²)

There is a preferred relationship between the size and dimensions of the cyclone 10 based on the capacity, velocity and the pressure at the gas flow inlet, which will ensure efficient separation of the moisture and contaminants from the gas. This relationship can be defined by the following equations:

$$d_2 = 2 \times d_1$$

$$a = 3 \times d_1$$

$$e = 1.5 \times d_1 \text{ approximate}$$

$$c = e + 4 \text{ inches}$$

$D = 4 \times d_1$ approx. for cyclones with a flow capacity from 10,000 c.f.m to 30,000 c.f.m.

The preferred liquid collection tank 30 for the trap has a cylindrical shape and is made of stainless steel. The size of the tank is determined by the flow capacity of the gas system. For example, a tank size having a diameter of about 6 inches or more and a depth of about 18 inches may be suitable for a digester gas system with a low flow capacity, for instance in the range of 1000 to 3000 c.f.m. A tank having a diameter of several feet and a height of several feet or more can be used in a system designed for high gas flows. Although a smaller tank size for a particular gas system may be theoretically possible, this could result in very frequent discharges of the moisture to the drain, for example, every few minutes. If an automatic, electrically actuated solenoid control valve in the moisture drain line is used for this purpose, a frequent "on" and "off" switching of this valve is undesirable.

The trap system of FIG. 1 includes a liquid level gauge 37 mounted on the liquid holding tank 30 and having a first or high liquid level sensor 38 for sensing when the level of liquid in the liquid holding tank has reached a predetermined maximum height and a second or low liquid level sensor 40 for sensing when the level of liquid in the tank has fallen to a minimum height. The liquid level gauge includes a vertically extending glass tube 42. It will be understood that one can observe the level of liquid or water in the holding tank 30 by observing the level of the liquid or water in this glass tube. The tube is connected to two shut-off valves 44 and 46 which can be used to control the flow of water into and out of the glass tube and from and into the holding tank 30. These valves are connected by short pipes to the side of the holding tank 30. The liquid level sensors 38, 40 are mounted on the glass tube 42 and are connected to the wall of the holding tank by suitable brackets.

A solenoid control valve 50 is opened or closed by the liquid level sensors 38, 40 in order to control the level of liquid in the holding tank. This valve 50 permits liquid or water to flow out of the holding tank to a drain 52 when the level of liquid in the tank 30 reaches the aforementioned maximum height. It will be understood that the sensors 38, 40 are capable of detecting liquid level through the wall of glass tube 42 and can activate electrically the valve 50 in order to open or close it. One form of sensing device that is suitable for this purposes is "Namco Controls" Capacitive Proximity Switch, Series No. EE720-20100.

A drain line 54, connected to a bottom portion of the holding tank 30 empties into the aforementioned drain 52. The valve 50 is mounted in this drain line. A by-pass line 56 is connected to the drain line 54. The drain line 54 is equipped with shut-off valves 60 and 62 which are arranged on opposite sides of the control valve. The by-pass line 56 is provided with its own shut-off valve 64. The by-pass line 56 is used for maintenance of the control valve. Preferably the drain line and all associated valves and components are fabricated of stainless steel, for example type 316, to prevent corrosion problems.

To explain further the operation of the trap system shown in FIG. 1, the separated moisture particles flow through the connecting pipe 32 into the holding tank by force of gravity and the pressure exerted by the gas system. The moisture (contaminated water) collects in the tank because it cannot escape to the drain 52 with the control valve 50 closed. Preferably, the control valve 50 is of a "normally closed" type so that it is closed when deenergized and open when energized by the electrical control circuit. This type of control valve will close if there is a power failure. The control valve itself is of standard configuration and therefore need not be described in detail herein. It should be selected to withstand the maximum operating pressures of the gas system and the anticipated operating conditions.

When the rising liquid in the tank reaches the high level, it will be detected by the liquid level sensor 38 which immediately energizes the control valve to open and permit the liquid to flow to the drain. The control valve then remains open until the liquid drops to a low level. When the liquid has fallen to this level, the sensor switch 40 deenergizes the valve 50 causing it to close and thereby keep the level of the liquid in the tank at the minimum height (low level).

Figure 6:
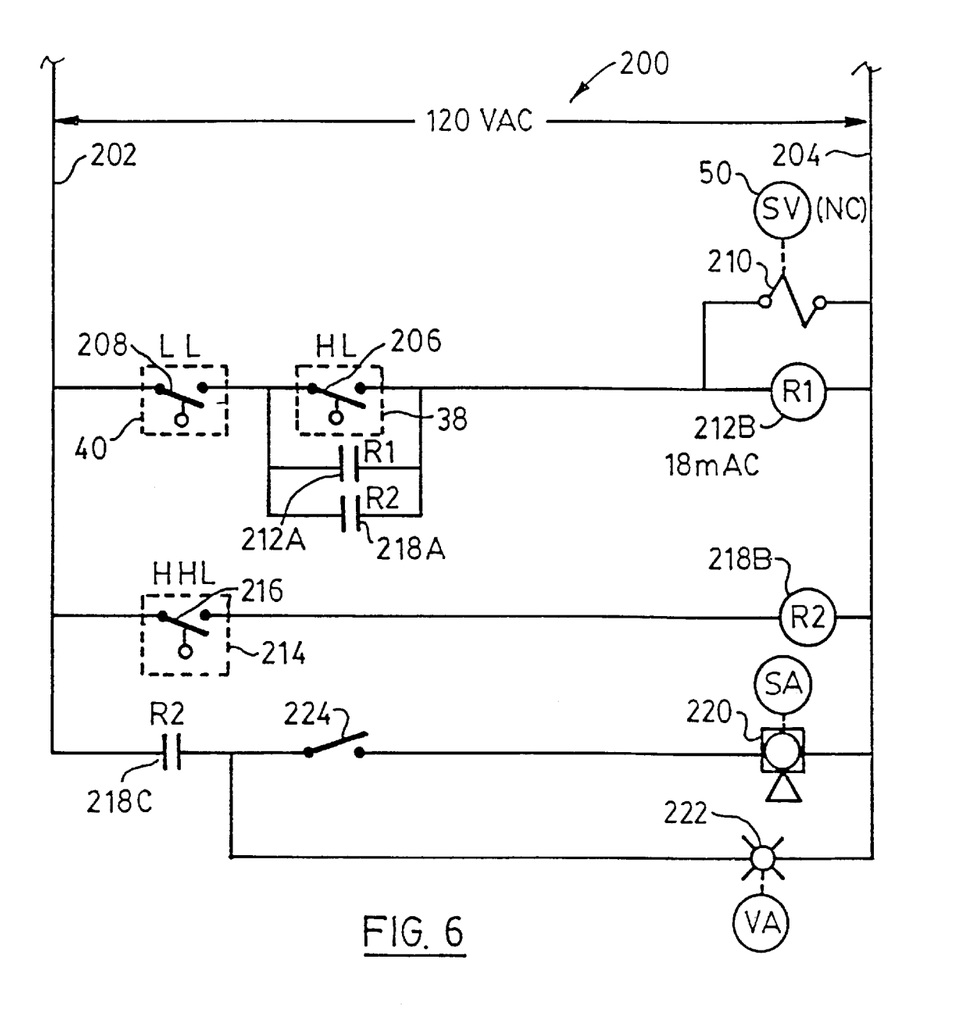
FIG. 6 is an electrical circuit diagram indicating the preferred electrical components used in the operation of the separator of FIG. 1.

Referring to FIG. 6, which shows a preferred electrical control system 200 for the separator 10 in FIG. 1, the manner in which the first or high liquid level sensor 38 and the second or low liquid level sensor 40 control the operation of the solenoid control valve 50 will now be described in greater detail. Power to the control system 200 is supplied by a line conductor 202 and a neutral conductor 204 which are connected to a conventional 120 VAC power source.

As mentioned above, the liquid level sensors 38 and 40 are capable of detecting liquid level through the wall of the glass tube 42 in order to activate the opening or closing of the solenoid control valve 50. Each liquid level sensor 38 and 40 includes an electric switch 206 and 208, respectively, which will be closed when the sensor detects liquid at the level in the glass tube where the sensor is located. When liquid is not detected, the sensor switches will be opened. For ease of reference, hereinafter the switch 206 will be referred to as the high level switch 206 and the switch 208 will be referred to as the low level switch 208. The solenoid control valve 50 includes a solenoid 210 which, when energized, causes the control valve 50 to open. When the solenoid 210 is not energized, the control valve 50 remains closed.

In the control system 200, the low level switch 208, the high level switch 206, and the solenoid 210 of the control valve 50 are all connected in series between the line conductor 202 and the neutral conductor 204. A relay switch 212A is connected in parallel with the high level switch 206 such that the high level switch 206 is effectively by-passed when the relay 212A is closed. An activating coil 212B for the relay 212A is connected in parallel with the solenoid 210 such that relay 212A will remain closed as long as current is provided to the solenoid 210.

When the water level in the holding tank 30 reaches a level such that the water in the glass tube 42 is detected by the high liquid level sensor 38, the sensor 38 will cause the high level switch 206 to close. At this water level, the low level switch 208 will also be closed as the second liquid level sensor 40 will also be detecting liquid. As a result, current will be provided to the solenoid 210 of the control valve 50, thereby causing the control valve 50 to open, which permits water to drain from the tank 30. At the same time, current will be supplied to the activating coil 212B of the relay 212A, thus causing the relay 212A to close. As water drains from the holding tank 30, the liquid level in the glass tube 42 will drop below the high liquid level sensor 38, which will cause the high level switch 206 to open. However, because the relay 212A is closed, the opening of the high level switch 206 will not interrupt the flow of current to the solenoid 210 and the activation coil 212B, and so the control valve 50 will remain open and the relay 212A will remain closed.

As water continues to drain from the tank, the liquid level in the glass tube 42 will eventually drop below the low liquid level sensor 40, at which time the sensor 40 will cause the low level switch 208 to open. As a result, current to the solenoid 210 and the activation coil 212B of the relay 212A will be interrupted, which will cause the control valve 50 to close and the relay 212A to open. When the control valve 50 is closed, the water level in the tank 30 will start to rise again and liquid in the glass tube 42 will again be detected by the low liquid level sensor 40, resulting in the closure of the low level switch 208. However, as both the relay 212A and the high level switch 206 are open, no current will be provided to the solenoid 50 or the activation coil 212B of the relay 212A and the control valve 50 will remain closed until the water level in the glass tube 42 reaches the level of the first liquid level detector 38, at which time the cycle described above will begin again.

It will be appreciated that the control system 200 could be implemented using a variety of electrical configurations and components in the place of those described above. For example, a solid state switching device could be used in the place of the relay 212A.

The control system 200 includes a high water level warning/backup system which provides audible and visible alarms in the event that water fails to drain from the tank 30 in the manner discussed above.

The warning/backup system includes a third or high liquid level alarm sensor 214 for detecting when the level of water in the holding tank 30 has risen to a level above the normal high level or above where it would normally rise if the control system 213 was operating in the manner described above. The third liquid level sensor 214 may be a sensor that is identical to the other sensors 38 and 40 and it may be located on the glass tube 42 at a suitable distance above the first or high liquid level sensor 38. The third liquid level alarm sensor 214 includes an electrical switch 216 which is generally open, but which closes when the third sensor 214 detects that the water level in the holding tank 30 has risen a predetermined distance beyond the level at which the water would normally be detected by the first sensor 38.

The switch 216 of the third liquid level sensor 214 is connected in series with a relay activation coil 218B between the line 202 and neutral 204 conductors. When current is provided to the relay activation coil 218B, it activates two relay switches 218A and 218C. The relay switch 218C is connected in series with a parallel combination of a warning horn 220 and a warning light 222, between the line 202 and neutral 204 conductors. The relay switch 218A is connected in parallel with the high level switch 206 and the relay switch 212A.

In the event that water, for whatever reason, is not permitted to drain from the holding tank 30 in the manner described above when the water level reaches the detection level of the first high liquid level sensor 38, the water level will continue to rise until it triggers the third or high liquid level alarm sensor 214. When the third liquid level sensor 214 is triggered, it causes the switch 216 to close, which results in current being supplied to the relay activation coil 218B. The energization of the relay coil 218B causes the relay switches 218A and 218C to close.

Closure of the relay switch 218C causes current to be supplied to the horn 220, causing it to generate an audible alarm, and the light 222, causing it to generate a visual light alarm. The horn 220 and the light 222 will continue to signal an alarm as long as the switch 216 of third liquid level alarm sensor 214 is closed, although a manual switch 224 may be provided in series with the horn 220 to allow it to be manually deactivated.

Thus, the warning/backup system provides visible and audible alarms in the event that the water level in the holding tank 30 exceeds the detection level of the first high liquid level sensor 38 by a pre-determined amount. It will be appreciated that such an event could occur for a variety of reasons, including the failure of the either of the low level switch 208 or the high level switch 206 to close, or the failure or malfunction of the solenoid control valve 50.

In the event that the drainage failure is caused by a lack of closure of the high level switch 206, the relay switch 218A functions as a backup switch by providing an alternative current path to the solenoid 210 and the relay activation coil 212B, thus energizing the solenoid 210 and allowing the holding tank 30 to drain down to the detection level of the second or low liquid level sensor 40. In such a situation, the audio and visual alarms will cease while the level of water in the holding tank 30 is below the detection level of the third or high liquid level alarm sensor 214.

In the separator 10 of FIG. 1, the pipe section 26 at the gas outlet extends vertically into the housing and has an open bottom end indicated at 70 which is disposed in a horizontal plane indicated at H that is at or below a lowermost side 72 of the tangential inlet 18. In the preferred embodiment of FIG. 1, the pipe section 26 extends a short distance D below the lowermost side of the tangential inlet.

The structure of the cyclone or separator 10 is preferably made with stainless steel type 316L (18-8 Mo) to ASTM A 240, Grade "M" Standards. This steel is suitable for withstanding the corrosive action of the gas contaminants. The parts and components are welded together using the known tungsten inert gas process (TIG) which utilizes helium gas.

Another feature of the separator 10 is the use of a deflector 80 mounted inside the housing 12 on an upstream side 82 of the tangential inlet 18. This deflector, which can be made from a suitably mounted steel plate, preferably curved, acts to deflect a circulating gas stream indicated at G in FIG. 2 in the upper region 16 of the housing so that the deflected gas stream can flow parallel to a gas stream at E entering through the gas inlet 18 during operation of the separator. It is noted that in a conventional or plain cyclone separator, the entering gas stream is deflected and partially shut-off by the impingement of the whirling stream that has completed one revolution within the cyclone body. The impact of the whirling mass on the inlet stream introduces resistance to entry in much the same way as do two streams uniting in a tee. The remedy to this situation is to bring both streams parallel before they join which is achieved by utilizing the following features and devices:

(1) The roof of the cyclone in a shape of a frustum of a cone so that at the completion of the first convolution the whirling stream is parallel to and below the entering gas flow;

(2) The "separating" deflector plate which compels parallelism of the streams;

(3) The inner extended gas outlet pipe section 26 and the curved vanes 76 (see below) which ensure a smooth and unobstructed flow of clean gas to the downstream system for utilization.

All the above features are designed to reduce the pressure loss across the cyclone considerably (i.e. more than 50%) as compared with a plain cyclone of the same dimensions and to increase separation efficiency to more than 85%.

The deflector 80 shown in dashed lines in FIG. 2 comprises a fixed plate member 86 that is curved in plan view. In particular, it forms a concave surface that deflects the gas stream inwardly from the wall of the housing. The deflector plate 86 has a leading vertical edge 88 adjacent a wall of the housing. It will be understood that the height of the plate 86 would be at least the height of the gas inlet 18 at its upstream side 82.

Figure 4:
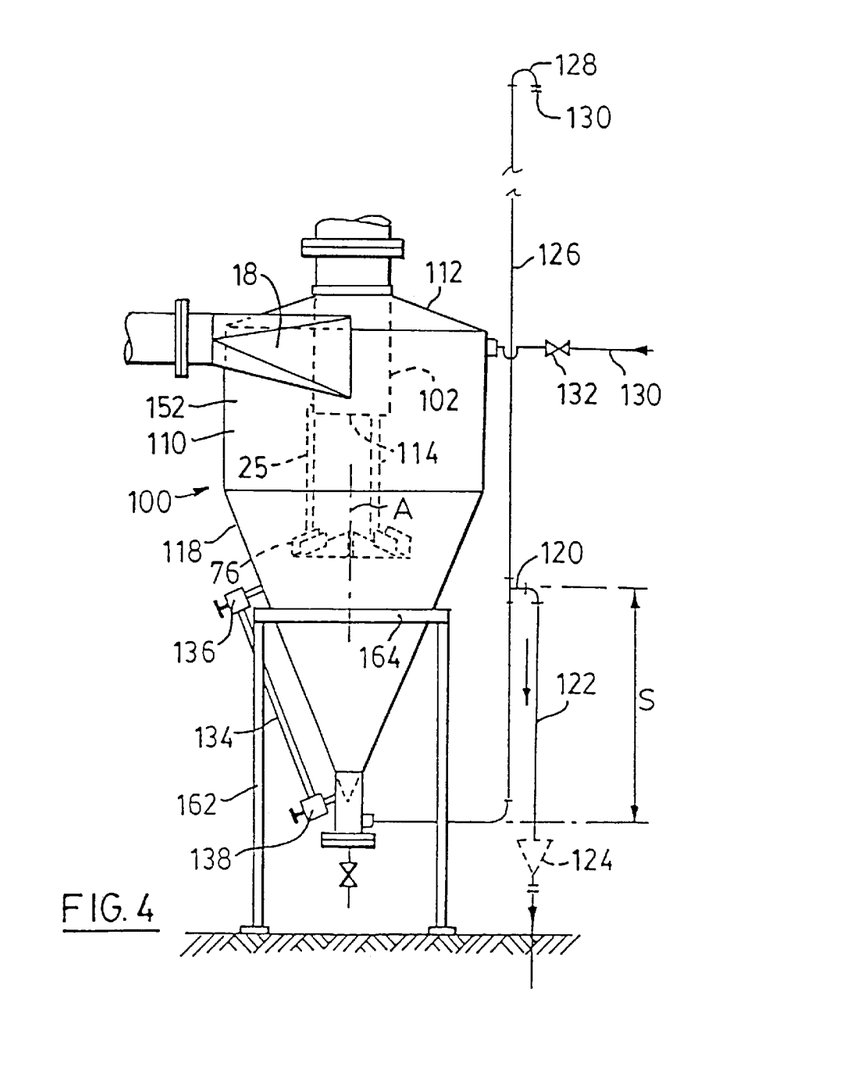
FIG. 4 is a schematic elevational view of a second embodiment of a centrifugal type separator designed and constructed in accordance with the invention.
Figure 5:
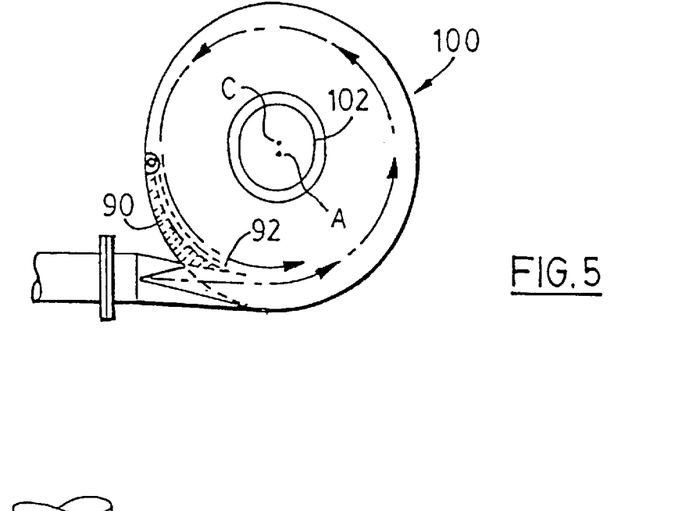
FIG. 5 is a top view of the separator of FIG. 4.
Figure 8:
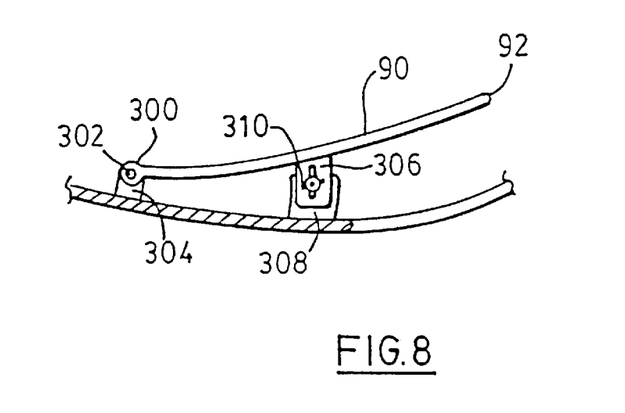
FIG. 8 is a detail cross-sectional view showing an adjustable deflector plate mounted within the separator.

In the version of the separator 100 shown in FIGS. 4 and 5, the deflector plate 90 is adjustable with respect to its position in the housing. The separator 100 shown in FIGS. 4 and 5 is designed for gas systems operating at pressure ranging from 6 to 30 inches of W.C. (153 to 762 mm) of water. The mounting of the plate 90 is shown in detail in FIG. 8. The plate's trailing vertical edge 92 can be moved closer to or further from a central vertical axis A of the cyclone housing to obtain an optimum position for reducing pressure loss. In one embodiment, a pivot shaft 302 is made with ⅝" diameter rod and is mounted with a minimum of two bushings or sleeves 300 and nuts with supporting brackets 304, the combination providing an adjusting device for the plate 90. The adjustable deflector can be provided with two pairs of sliding plates 306, 308 slotted for ⅝" diameter bolts complete with wing nuts 310 and spring washers for locking the plates in position at a suitable angle for optimum performance. It will be understood that there is an upper pair of plates 306, 308 at the top edge of the deflector and a lower pair of plates 306, 308 at the bottom edge of the deflector and in vertical alignment with the top pair.

The separator 100 of FIGS. 4 and 5 is a highly efficient, low resistance, centrifugal cyclone-type separator. In this separator, the roof 112 of the housing has the shape of a cone frustum. The separator 150 has a cylindrical upper region 152 with a vertically extending sidewall. The gas outlet pipe section 102 has a central axis at C which is offset from the central axis "A" of the housing as shown in FIG. 5 in order to improve the efficiency of this cyclone. Also, the shape of the roof portion 112 and the adjustable deflector plate 90 help to eliminate interference between the inlet stream of gas and the whirling stream within the cyclone or housing. This is accomplished by bringing these two streams parallel in their direction of movement before they join. This combination helps to reduce pressure loss by as much as 60% or more compared to a conventional cyclone of the same size. The back pressure of the cyclone unit shown in FIG. 4 is less than 0.5 velocity head.

FIG. 3 illustrates a preferred arrangement of the aforementioned vanes 76 which can be used in either of the centrifugal-type separators described herein. The vanes are preferably disposed centrally below the bottom end of gas outlet pipe section 26 or 102. The similar vanes are rigidly mounted by means of at least three suitable elongate straight plates (or bars) 25 of stainless steel extending from the gas outlet pipe 26 or 102 of the cyclone and secured to the outside surface of a holding ring 93 for the vanes either by welding or by being securely bolted. The vanes are arranged and located to guide the whirling gas flow into the vertical pipe section 26 or 102 through its bottom end. As shown in FIG. 1, a space is formed between the top ends of the vanes and the bottom end of pipe section 26 and this space is substantially open. Preferably the vanes 76 are curved as seen in the horizontal sectional view of FIG. 3. The ring 93 can have a vertical height of 1 to 1¼ inches and be made of stainless steel ¼" thick or as required for the particular application. The vanes are distributed evenly about a vertical central axis A of the housing of FIG. 1. As shown in FIGS. 1 and 4, the vanes are spaced apart from the bottom end 70 or 114 of the pipe section a substantial distance, although the extent of this distance can vary depending on the particular design characteristics of the cyclone.

Figure 7:
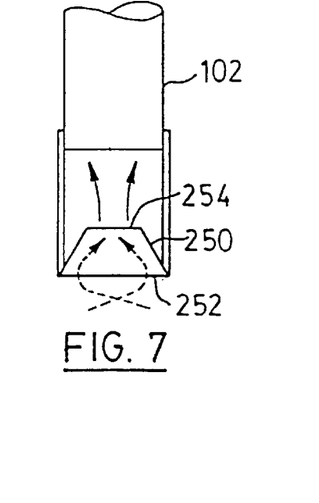
FIG. 7 is a partial detail view showing an alternate gas stream directing device mounted below the gas outlet.

FIG. 7 illustrates an alternative to the use of the vanes 76. Instead of curved vanes, one can employ a conical frustum guiding plate 250 that tapers upwardly as shown. This airflow guide is open at bottom end 252 and open at top end 254, the latter end having a diameter equal to or less than the gas outlet pipe 102. This guiding plate is located centrally below the bottom end of the pipe section as shown.

The separator 100 has a different trap system (as compared to the separator 10) for providing a positive water seal at a bottom end of the cyclone body in order to prevent gases from escaping through a liquid outlet 116. Again, the positive water seal provided by the trap system must not be less than 1.5 times the maximum operating gas pressure of the cyclone. In the separator 100, the water seal is automatically controlled by the height of the water level. In this embodiment, the water seal is formed in the conical lower region 118 of the separator. The level of water in the bottom of the separator is maintained by the location of upper end 120 of drain outlet line 122, which line extends to a drain 124 indicated schematically in FIG. 4. In other words, the level of water in the separator is controlled by the indicated height S of the upper end 120 above the liquid outlet.

A requirement for this type of automatic control of the height of the water seal is a properly arranged vent line indicated at 126 which runs directly to atmosphere and which is continuously open to atmosphere to maintain atmospheric pressure in the line at all times. A vent of this type prevents occurrence of the physical phenomenon known in hydraulics as a siphon phenomenon. This phenomenon, if allowed to occur, could result in loss of the water seal which would permit gas to escape through the drain line to the outside, creating hazardous operating conditions and loss of gas.

To ensure that the vent line 126 is constantly open to atmosphere, it is installed so as to be as vertical as possible and so as to have a minimum number of 90 degree elbows. There should be no more than 3 such elbows. The vent should terminate outdoors at a point no less than 2.5 meters above grade or operating level and it should be provided with a 180 degree bend indicated at 128 and have a bug screen 130 mounted on its end. This vent line, complete with all fittings, including bug screen, should be fabricated from stainless steel, preferably 316 stainless steel, to prevent corrosion.

In order to ensure a positive and continuous flow of dirty water or liquid to the drain 124, the drain line 122 should have not more than one 90 degree elbow and should run vertically as shown to a drain funnel open to the atmosphere to prevent plugging and back pressure.

To permit priming of the separator 100, a small, for example ½ inch water pipe 130 is connected near the upper end of the housing. This pipe will be equipped with a shut off valve 132. The pipe 130 is connected to a potable (separated) water supply system and it is used to prime the separator, that is, to initial fill the separator or the holding tank 30 to the proper level, and it is also used for periodic cleaning of the separator and the drain line.

Mounted to the side of the lower region 118 is a liquid level gauge 134. This gauge, which is in the form of a vertically extending glass tube, extends between two shut-off valves 136 and 138, which valves are used to control the flow of water into and out of the glass tube and from and into the adjacent cyclone housing. It will be understood that the gauge 134 simply permits manual observation of the level of the liquid (water) in the lower region 118 of the cyclone.

Both illustrated types of separators have similar moisture separation structure and differ primarily in moisture removal method. The simple and reliable water seal which is used for low pressure separators (with a pressure range from six to thirty inches of W.C., or 153 to 762 millimeters of $H_2O$) cannot be used for high pressure moisture separators such as that shown in FIG. 1 with a pressure of 3.0 psig. and higher. The required height of the water seal, e.g. 3.0 psig×1.5× 2.31=IO.4 ft. of W.C. which would make the height of the high pressure separator at least 2×IO.4=20.8 ft high. This would make the price of the separator too expensive and also its geometrical configuration would not conform to the required relationship between the individual components. This is the reason why the moisture holding tank complete with the high and low moisture sensors, control valves, etc. was developed for "high" pressure moisture separators.

The gas deflector in the top part of the cyclone of FIGS. 1 and 2 has no adjustable feature (pivot) and the top gas outlet is not offset eccentrically (unlike the gas outlet in the cyclone of FIGS. 4 and 5). These two features can be omitted in the design of the "high" pressure moisture separator in which case the resulting pressure drop of approximately ¼" to ½ of W.C. is not as significant as for the "low" pressure cyclones.

Connected to the bottom end of the lower region 118 is a short vertical pipe 160 to the side of which the end 116 of the drain pipe is connected.

As illustrated, both the separators 10, 100 can be supported in the vertical position by means of a suitable framework indicated at 162 which can include four vertical uprights and a horizontal connecting frame 164.

The thickness of the cyclone wall is based on the cylindrical part of the cyclone which is a type of thin-wall cylinder. Use Barlow's empirical formula for thin-walled cylinders under internal pressure:

$$S = \frac{p \times D}{2t}; \qquad t = \frac{p \times D}{2 \times S},$$

where
S—Unit Stress (in p.s.i.)
p—Internal unit pressure (in p.s.i.)
D—External Diameter of Cylinder (in inches)
t—Thickness of Cylinder Wall (in inches) Use S=6,000 p.s.i. for Stainless Steel-Welded construction.

In specific cases, where there are other, additional forces and/or stresses in the gas system which may have an effect on structural strength of the cyclone-these forces and/or stresses must be included in design calculations.

It will be understood by those skilled in the moisture separating art that various modifications and changes can be made to the described centrifugal type separators without departing from the spirit and scope of this invention. Accordingly, all such modifications and changes as fall within the scope of the appended claims are intended to be included within the scope of this invention.

I claim:

1. A separator for centrifugal separation of moisture from a moisture laden gas stream comprising:

an upright separator housing having an interior with a substantial round horizontal cross-section and a conical lower region which tapers downwardly from an upper region of the housing;

a tangential gas inlet for said gas stream located in said upper region of the housing;

a gas outlet located centrally in a top end of said housing, said gas outlet including a vertically extending pipe section connected to said housing;

a liquid outlet for removing separated liquid from said lower region;

a trap system including a liquid holding tank for providing a positive water seal in order to prevent gases from said gas stream from escaping through said liquid outlet, wherein said holding tank is connected to said liquid outlet so that liquid at a bottom end of said housing can flow through said liquid outlet and into said holding tank during operation of said separator, said trap system including a liquid level gauge mounted on said holding tank and having a first liquid level sensor for sensing when the level of liquid in said holding tank has reached a predetermined maximum height, a second liquid level sensor for sensing when the level of liquid in said holding tank has fallen to a minimum height, and a third liquid level sensor for detecting when the level of liquid in said holding tank has risen to a level above the predetermined maximum height, and wherein a solenoid control valve is opened or closed by said first and second liquid level sensors in order to control the level of liquid in said holding tank, said control valve permitting liquid to flow out of said holding tank to a drain when the level of liquid in said holding tank reaches said maximum height, and a warning device operable to generate a warning and turned on by means of said third liquid level sensor when this sensor detects a liquid level above said predetermined maximum height.

2. A separator according to claim 1 wherein a drain line is connected to a bottom portion of said holding tank, said drain line emptying into said drain and said solenoid control valve is mounted in said drain line.

3. A separator according to claim 1 wherein said holding tank is cylindrical and made of stainless steel, has a diameter of at least six inches and a depth of at least eighteen inches.

4. A separator according to claim 1 wherein said liquid level gauge comprises a vertically extending glass tube and two shut-off valves for controlling flow of water into and out of said glass tube and from and into said holding tank.

5. A separator according to claim 1 wherein said housing includes an adjustable deflector mounted inside said housing on an upstream side of said tangential gas inlet, said deflector being curved in plan view and acting to deflect a circulating gas stream in said upper region of said housing so that the deflected gas stream tends to flow parallel to a gas stream entering said housing through said tangential inlet.

6. A separator according to claim 1 wherein said pipe section extends vertically into said housing and has an open bottom end that is below a lowermost side of said tangential inlet.

7. A separator according to claim 6 including a series of vanes mounted centrally below said bottom end of the pipe section, said vanes being arranged to deflect spinning gases into said pipe section through its bottom end.

8. A separator according to claim 1 wherein said upper region of the housing is cylindrical and has a roof shaped as a conical frustum.

9. A separator for centrifugal separation of moisture from a moisture laden gas stream comprising:

an upright separator housing having an interior with a substantial round horizontal cross-section and a conical lower region which tapers downwardly from an upper region of the housing;

a tangential gas inlet for said gas stream located in said upper region of the housing;

a gas outlet located centrally in a top end of said housing, said gas outlet including a vertically extending pipe section connected to said housing;

a liquid outlet for removing separated liquid from said lower region;

a trap system including a liquid holding tank for providing a positive water seal in order to prevent gases from said gas stream from escaping through said liquid outlet, wherein said holding tank is connected to said liquid outlet so that liquid at a bottom end of said housing can flow through said liquid outlet and into holding tank during operation of said separator, said trap system including a liquid level gauge mounted on said holding tank and having a first liquid level sensor for sensing when the level of liquid in said holding tank has reached a predetermined maximum height and a second liquid level sensor for sensing when the level of liquid in said holding tank has fallen to a minimum height;

a drain line connected to a bottom portion of said holding tank, said drain line being adapted to empty into a drain;

a solenoid controlled valve mounted in said drain line, said valve being opened and closed by said first and second liquid level sensors in order to control the level of liquid in said holding tank, said control valve permitting liquid to flow out of said holding tank to said drain when the level of liquid in said holding tank reaches said maximum height; and a by-pass line is connected to said drain line at at least one end of the by-pass line, said one end of the by-pass line being connected between said holding tank and said control valve so as to permit liquid to flow around said control valve and directly to said drain when required.

10. A separator for removing moisture from a moisture laden gas stream comprising:

a separator apparatus having an upright housing with a tangential gas inlet for said gas stream located in an upper region of said housing and a gas outlet located in a roof of said housing, said housing being generally circular in horizontal cross-section and having a conical lower region which tapers downwardly from said upper region;

a vertically extending, substantially cylindrical gas outlet pipe section having an open upper end at said gas outlet and an open bottom end that is at or below a lowermost side of said tangential gas inlet;

a liquid outlet for removing separated liquid from said lower region;

a trap system for providing a positive water seal at a bottom end of said housing in order to prevent gases from escaping through said liquid outlet; and a series of curved, similar vanes disposed centrally below said bottom end of the gas outlet pipe section, said vanes being spaced a substantial distance below said bottom end of the pipe section and arranged to guide gas flow into said gas outlet pipe section through its bottom end, wherein a space formed between top ends of said vanes and said bottom end of the pipe section is substantially open.

11. A separator according to claim 10 wherein said pipe section extends a short distance below said lowermost side of said tangential gas inlet.

12. A separator according to claim 10 wherein said vanes are each curved in a horizontal plane and are distributed evenly about a vertical central axis of said pipe section.

13. A separator according to claim 10 wherein said gas outlet has a centreline which is offset from a centre axis of said roof which is shaped generally as a conical frustum.

14. A separator according to claim 10 wherein said trap system includes a water holding tank arranged below said housing and connected to said liquid outlet and a control system for controlling the level of water in said holding tank.

15. A separator according to claim 10 wherein said trap system includes a piping arrangement for controlling the level of water in said conical lower region of the housing, said piping arrangement including a vertically extended drain pipe that is vented to atmosphere.

16. A separator according to claim 10 wherein said roof of said housing has a conical frustum shape and an upwards and inwards slope.

17. A separator for centrifugal separation of moisture from a moisture laden gas stream comprising:

a housing with a substantially circular interior horizontal cross-section and a conical lower region that tapers downwardly from an upper region of said housing;

a tangential gas inlet for said gas stream located in said upper region;

a gas outlet located centrally in a roof of said housing;

a vertically extending pipe section connected to said outlet and having an open bottom end that is at or below a lowermost side of said tangential gas inlet;

a liquid outlet for removing separated liquid from said lower region; and a gas flow guiding plate having the shape of a conical frustum that tapers upwardly to an open top end, said guiding plate also having an open bottom end, wherein said guiding plate is located centrally below said bottom end of the pipe section.

18. A separator according to claim 17, including a deflector mounted inside said housing on an upstream side of said tangential gas inlet and adapted to deflect a circulating gas stream in said upper region of said housing so that the deflected gas stream tends to flow parallel to a gas stream entering said housing through said tangential gas inlet during use of said separator wherein said deflector comprises a plate member that is curved in plan view and has a leading vertical edge adjacent a wall of said housing.

19. A separator according to claim 18 wherein said deflector is adjustable with respect to its position in said housing so that an adjustable vertical edge thereof can be moved closer to or further from a vertical central axis of said housing.

20. A separator according to claim 17 wherein said pipe section extends a short distance below said lowermost side of said tangential gas inlet and said separator includes a trap system for providing a positive water seal in order to prevent gases from said gas stream from escaping through said liquid outlet.

21. A separator according to claim 20 wherein said separator housing has a roof with a conical frustum shape and an upwards and inwards slope.

* * * * *